July 4, 1961  F. H. FRANTZ  2,990,763
DIAZO TYPE PRINTING APPARATUS
Filed July 8, 1959
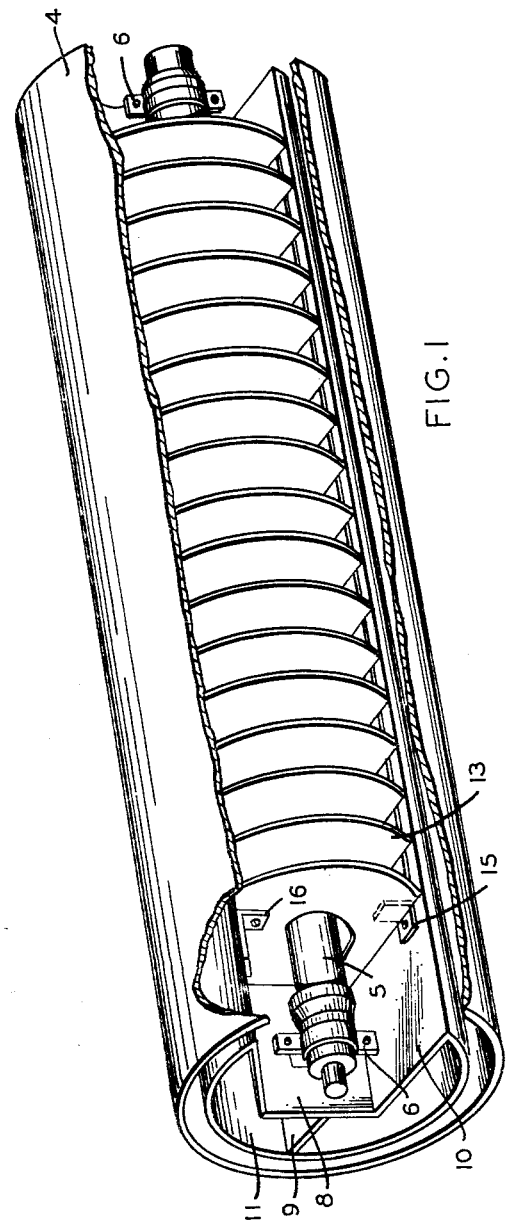
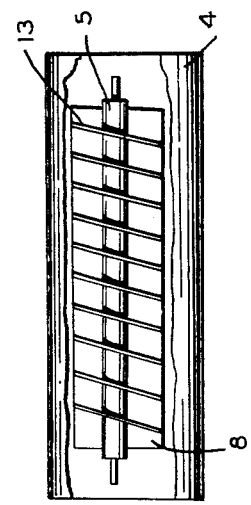
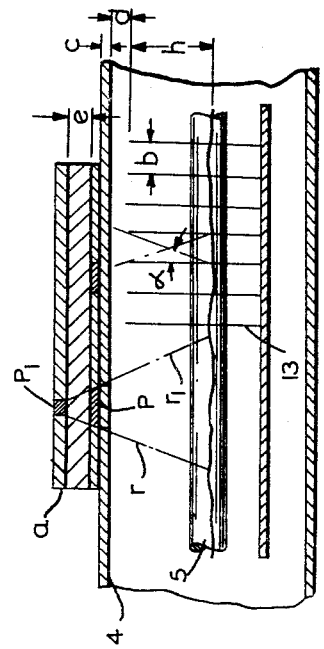
INVENTOR.
FREDERICK H. FRANTZ
ATTORNEYS

United States Patent Office 2,990,763
Patented July 4, 1961

2,990,763
DIAZO TYPE PRINTING APPARATUS
Frederick H. Frantz, Binghamton, N.Y., assignor to General Aniline & Film Corporation, New York, N.Y., a corporation of Delaware
Filed July 8, 1959, Ser. No. 825,790
3 Claims. (Cl. 95—77.5)

This invention relates to photographic printing apparatus and more particularly to diazo type apparatus wherein the original, in contact with the sensitized material, travels over a transparent cylinder to be exposed to radiation from an elongated tubular light source coaxially located within the cylinder.

Printing apparatus of the above type are widely used for making direct positive copies of any original which is sufficiently translucent to permit the light to pass through and expose the sensitized material. Where the original is opaque, the light is excluded from reaching the sensitized material and such portions will remain dark upon development of the copy.

The diazo process yields a direct positive image in that the areas where the light is permitted to reach the sensitized material will become white. Because of the positive printing characteristics of this material, the original to be copied must be placed on the sensitized material face up, otherwise a mirror image would result. Therefore, the exposing light reaches the sensitized surface of the copy material through the base or support which bears the image to be reproduced. Consequently, the thickness of the base material becomes a contributing factor of the line resolution obtained.

In most applications, the thickness of the image-bearing surface is of no consequence as to the resolution requirement, and losses due to undercutting may well be tolerated. By undercutting is meant the exposure of the sensitized material by light rays which have an acute angle of incidence transverse to the copy material, reaching behind the opaque line of the original and producing an undesired exposure. However, where great accuracy of reproduction is necessary of fine-line images, undercutting presents a serious problem.

It is therefore the primary object of this invention to provide a printing apparatus in which maximum resolution of the image to be copied may be obtained and undercutting minimized.

Another object of the invention is to provide a light source and printing cylinder assembly in which the exposure light is collimated and stray radiation substantially eliminated.

It is a particular feature of the invention that the collimating means are simple in construction and adaptable to any tubular light source and enable uniform light distribution.

Other objects and advantages will be apparent from the following description of the invention, pointed out in particularity in the appended claims, and taken in connection with the accompanying drawing in which:

FIG. 1 is a perspective view of the printing cylinder and light source assembly with the light collimating plates attached;

FIG. 2 is a schematic representation showing the slanting arrangement of the collimating plates;

FIG. 3 is a schematic representation of the relationship between the printing cylinder, the original and the copy material and the effect of the collimating plates.

Inasmuch as the invention pertains to the improvement of the light source used in diazo type reproduction machines, illustrations in the figures are restricted to this particular portion of the apparatus. It is well known in the art that such apparatus has various mechanical components whereby the glass cylinder is rotated and conveyor belts pass the original to be copied and the sensitized material over the printing cylinder at a given speed. The light source used is generally of the high-pressure mercury vapor type, although other gaseous discharge tubes may be employed as long as they contain radiation in the ultra-violet spectrum to which the sensitized material is reactive.

High-pressure mercury vapor lamps are most efficient at a given temperature, therefore, cooling by an air blast is usually employed within the cylinder to keep the temperature more or less constant.

Referring now to the figures, in FIG. 1 is seen the printing cylinder 4 and the mercury vapor lamp 5 coaxially placed therein. The lamp 5 is mounted by suitable brackets 6 onto the base plate 8 which is part of the cooling duct comprising cross-members 9 and 10 and the cylindrical housing 11. This assembly within the cylinder 4 is suitably mounted onto the framework of the reproducing machine not shown here.

A plurality of radiation deflecting elements in the form of plates 13 are placed along the axis of the tube 5. These plates are horseshoe shaped and arranged to straddle the lamp 5, being secured to cross-members 10 and the housing 11 by suitable brackets 15 and 16.

As seen is FIG. 2, which is a view similar to FIG. 1, except not in perspective and reduced in size, the plate members 13 are positioned at an acute angle with respect to the axis of the discharge tube 5.

The purpose and function of the plate members 13 will be explained hereafter.

The problem which the invention sets out to solve may first be considered by referring to FIG. 3 which shows, in one portion, the conventional arrangement where the rays of light from the discharge tube 5 strike the sensitized material $a$ through the image-bearing surface of the original. For the sake of a better understanding, the dimensions of the original and the sensitized material, with respect to the discharge tube 5 and the printing cylinder 4, are greatly exaggerated.

It is seen that aside from the normal radiaton, which reaches the image-bearing surface in a direction perpendicular thereto, rays from other directions will strike at an angle, as for example rays $r$ and $r_1$ which undercut, in that in the sensitized copy material the image $P_1$ corresponding to the dark portion P of the original will become much smaller. The thickness of the image-bearing layer, indicated by $e$, plays an important part and causes the line degradation, termed undercutting. If the image-bearing surface of the original could be placed facing the sensitized material $a$, the rays could not reach behind the dark areas of the image. However, as pointed out before, while such placement of the original would give maximum resolution, it would result in a mirror-imaged copy.

Obviously, if radiation components which do not fall perpendicular to the image-bearing surface could be eliminated or substantially reduced, maximum resolution could be obtained. The radiation deflecting elements 13 perform this function. Placed along the discharge tube 5, they will impede and absorb stray radiation which would reach the original at an angle other than substantially perpendicular thereto. For the purpose of absorption, the plates 13 have a matt black surface.

The height and spacing of the deflecting plates 13, for optimum results, are based on two distinct conditions which must be satisfied. It is essential that the light distribution at the surface of the sensitized copy material be uniform and that the transmission angle of the rays striking at the lines of the original shall deviate as little as possible from the perpendicular.

If the total light passed between two deflector plates is designated as $L_t$, the following relationship holds:

$$L_t = [2(h+d+c+e)\tan \alpha] - b$$

where
$h$ = height of deflector plate above the light source,
$b$ = distance between deflector plates,
$d$ = distance of deflector plates from inner wall printing cylinder,
$c$ = thickness of the printing cylinder wall,
$e$ = thickness of the original to be copied.

The spacing between plates may be determined by substitution. Assuming that $L_t = 4b$, for example, in which case $$b = \sqrt{\frac{2h}{5}(h+d+c+e)}$$

The undercutting component of the light rays, considering the thickness of the original, may be calculated from the transmitting angle of the light from the relation $$\tan \alpha = \frac{h}{b}$$

where
$\alpha$ = transmitting angle of light,
$h$ = the height of the plate members, and
$b$ = the separation between plates.

The total undercutting $U_t$ is given from $$U_t = \frac{2eb}{h}$$

where
$e$ = thickness of the original.

The proper correlation of the above conditions will result in the required resolution and printing uniformity. Although careful design along the lines indicated results in substantially uniform light distribution, the latter may be further enhanced by the slanting of the plates 13 at an acute angle with respect to the axis of the discharge tube 5 as seen in FIG. 2. By this arrangement, as the sheet material passes the light source above the plates, an overlapping of discrete light areas is produced which compensates for any unevenness of light intensity.

I claim:

1. In a diazo type printing apparatus utilizing a rotating translucent cylinder surrounding a stationary elongated gaseous discharge tube, the actinic radiation of which, in the direction normal to the axis thereof, is used for exposing photo-sensitive material in contact with an original passing over said cylinder, said radiation having components deviating from said direction which adversely affect the exposure of said material, said cylinder also having a cooling duct positioned therein the walls of which support said discharge tube, a plurality of radiation deflecting elements comprising U-shaped plates straddling and substantially surrounding said discharge tube supported in contact with the walls of said cooling duct and distributed along the axis of said discharge tube and extending in the direction parallel to said actinic radiation, said plates being so spaced and dimensioned as to intercept and absorb substantially all the adverse components of said radiation.

2. A photo printing apparatus in accordance with claim 1 wherein said plates are positioned along said discharge tube at an acute angle with respect to the axis thereof.

3. A photo printing apparatus in accordance with claim 1 wherein the spacing between the plates is determined by the formula $$b = \sqrt{\frac{2h}{5}(h+d+c+e)}$$

in which $h$ = the height of the plate, $d$ = distance of plate from cylinder wall, $c$ = cylinder wall thickness and $e$ = thickness of image-bearing support.

References Cited in the file of this patent

UNITED STATES PATENTS

| | | |
|---|---|---|
| 2,733,644 | Taini | Feb. 7, 1956 |
| 2,760,419 | Gelb | Aug. 28, 1956 |
| 2,826,976 | Gelb | Mar. 18, 1958 |